United States Patent
Sloan et al.

(10) Patent No.: US 6,252,731 B1
(45) Date of Patent: *Jun. 26, 2001

(54) PARAMETRIC OPTIMIZATION USING DISC DRIVE READ CHANNEL QUALITY MEASUREMENTS

(75) Inventors: Brett Alan Sloan, Edmond; Karl Louis Enarson, Yukon; Shawn Alan Wakefield, Norman, all of OK (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,725

(22) Filed: Jan. 30, 1998

Related U.S. Application Data
(60) Provisional application No. 60/062,505, filed on Oct. 16, 1997.

(51) Int. Cl.[7] ..................................................... G11B 27/36
(52) U.S. Cl. .................................. 360/31; 360/53; 360/46
(58) Field of Search ..................................... 324/212, 226; 369/53, 53.1, 53.31, 53.35, 53.36; 360/53, 31, 65, 46, 67, 68, 75, 77.02; 714/774, 704, 746

(56) References Cited

U.S. PATENT DOCUMENTS

| | | |
|---|---|---|
| 3,723,980 | 3/1973 | Gabor . |
| 4,799,112 | 1/1989 | Bremmer et al. . |
| 4,821,125 | 4/1989 | Christensen et al. . |
| 4,907,109 | 3/1990 | Senio . |
| 4,937,689 | 6/1990 | Seaver et al. . |
| 4,965,501 | 10/1990 | Hashimoto . |
| 5,047,876 | 9/1991 | Holsinger . |
| 5,107,378 | 4/1992 | Cronch et al. . |
| 5,262,907 | 11/1993 | Duffy et al. . |
| 5,276,662 | 1/1994 | Shaver, Jr. et al. . |
| 5,408,365 | 4/1995 | Van Doorn et al. . |
| 5,422,760 | 6/1995 | Abbott et al. . |
| 5,430,768 | 7/1995 | Minuhin et al. . |
| 5,459,757 | 10/1995 | Minuhin et al. . |
| 5,493,454 | 2/1996 | Ziperovich et al. . |
| 5,502,713 | 3/1996 | Lagerqvist et al. . |
| 5,550,502 | 8/1996 | Aranovsky . |
| 5,557,482 | 9/1996 | Christensen et al. . |
| 5,592,340 | 1/1997 | Minuhin et al. . |
| 5,600,500 | 2/1997 | Madsen et al. . |
| 5,631,999 | 5/1997 | Dinsmore . |
| 5,687,036 | 11/1997 | Kassab . |
| 5,754,353 | 5/1998 | Behrens et al. . |
| 5,761,212 | 6/1998 | Foland, Jr. et al. . |
| 5,774,285 | 6/1998 | Kassab et al. . |
| 5,954,837 | 9/1999 | Kim . |

Primary Examiner—Alan T. Faber
(74) Attorney, Agent, or Firm—Crowe & Dunlevy

(57) ABSTRACT

An apparatus and method are disclosed for optimizing the operational performance of a disc drive having a head adjacent a rotatable disc, a servo circuit which controls the position of the head and a read channel for decoding read signals from the head to reconstruct data previously stored on the disc. The read channel includes a channel quality monitor which generates a channel quality measurement indicative of read channel quality, the channel quality measurement determined from error values associated with the data reconstructed by the read channel from the read signal. An optimum value for a selected parameter affecting disc drive performance is selected by determining an associated quality measurement value for each of a plurality of parameter values, and selecting the optimum value for the parameter in relation to the associated quality measurement values. Preferably, each associated quality measurement value is determined in less than one revolution of the disc.

10 Claims, 6 Drawing Sheets

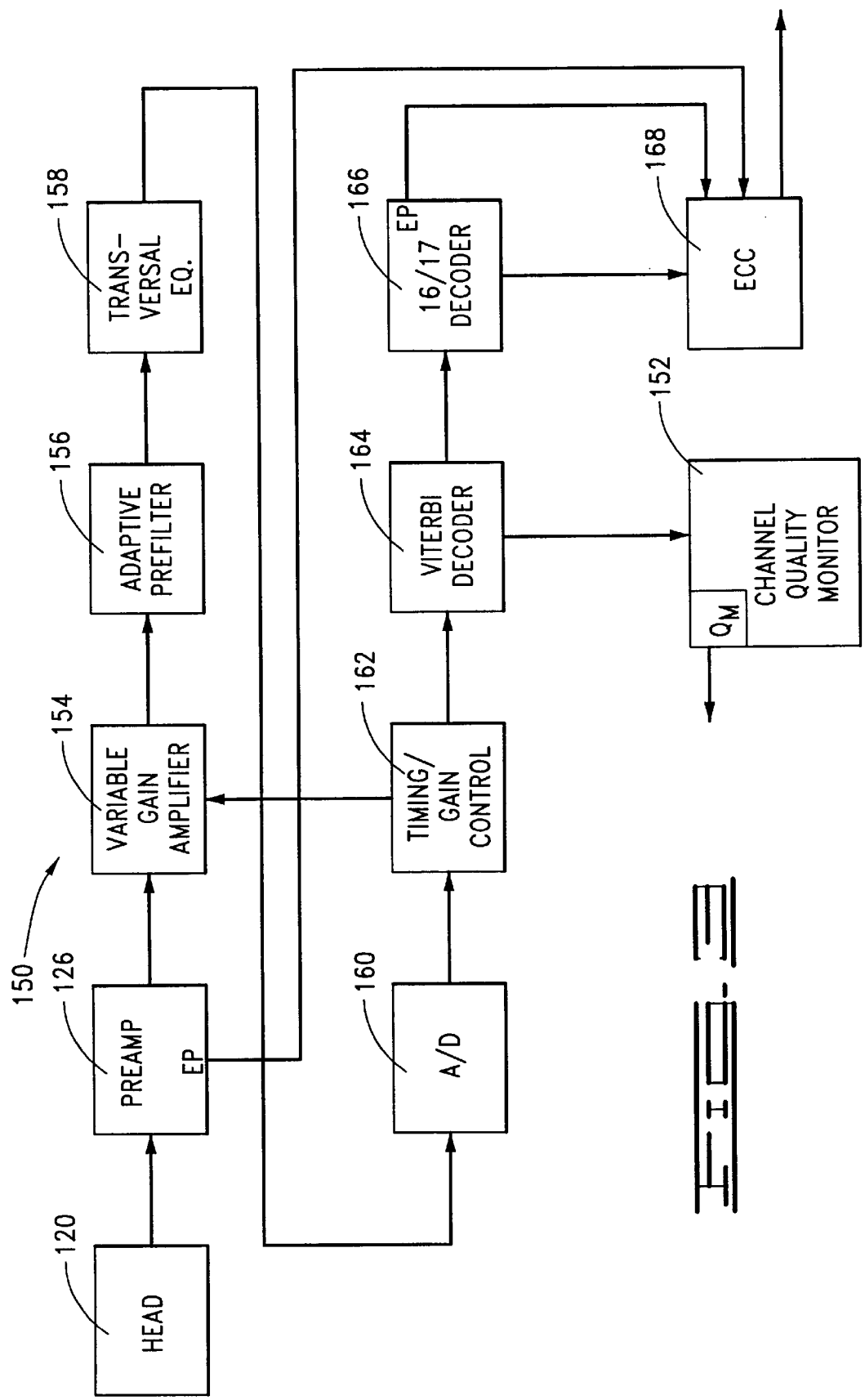

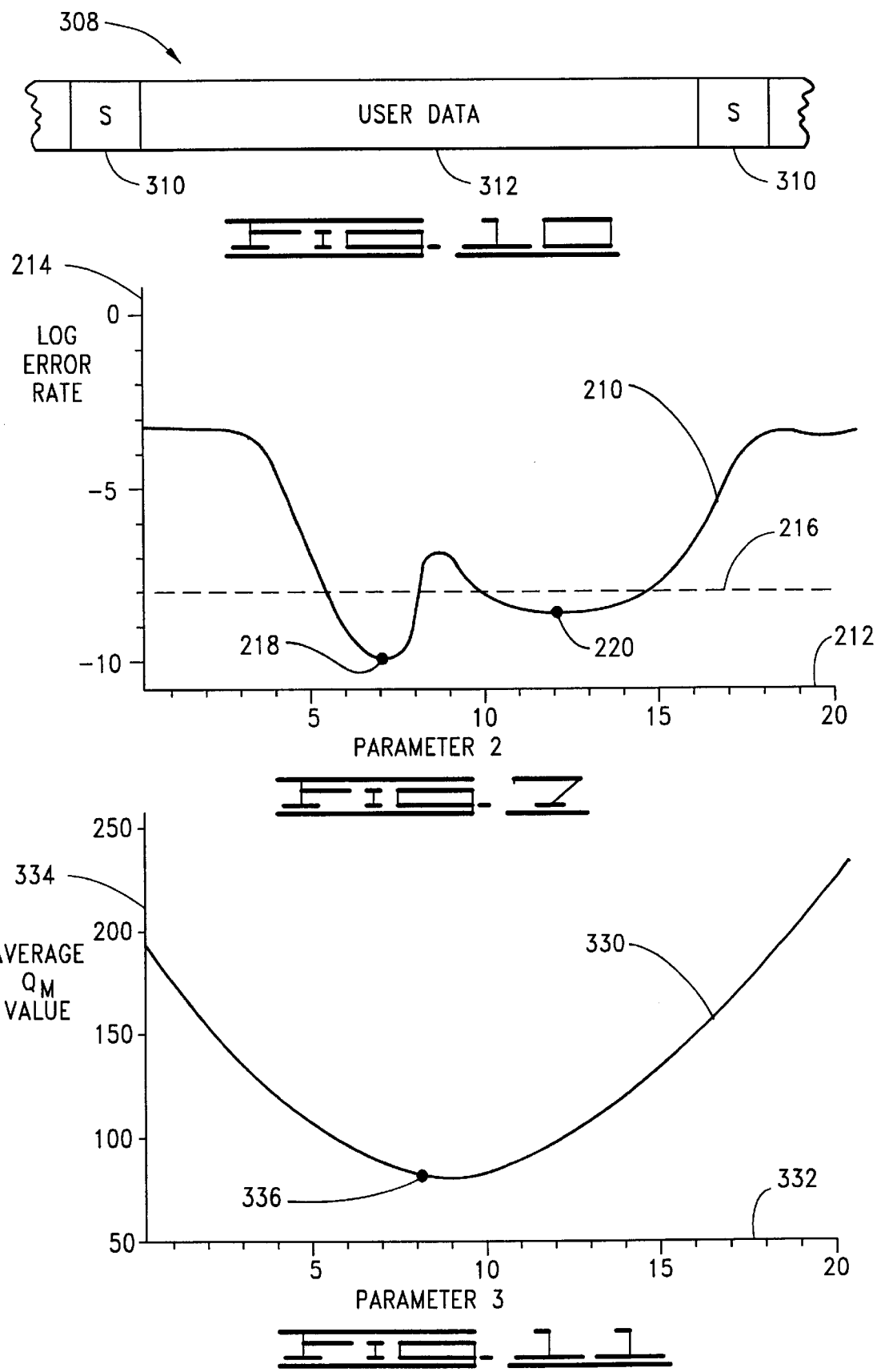

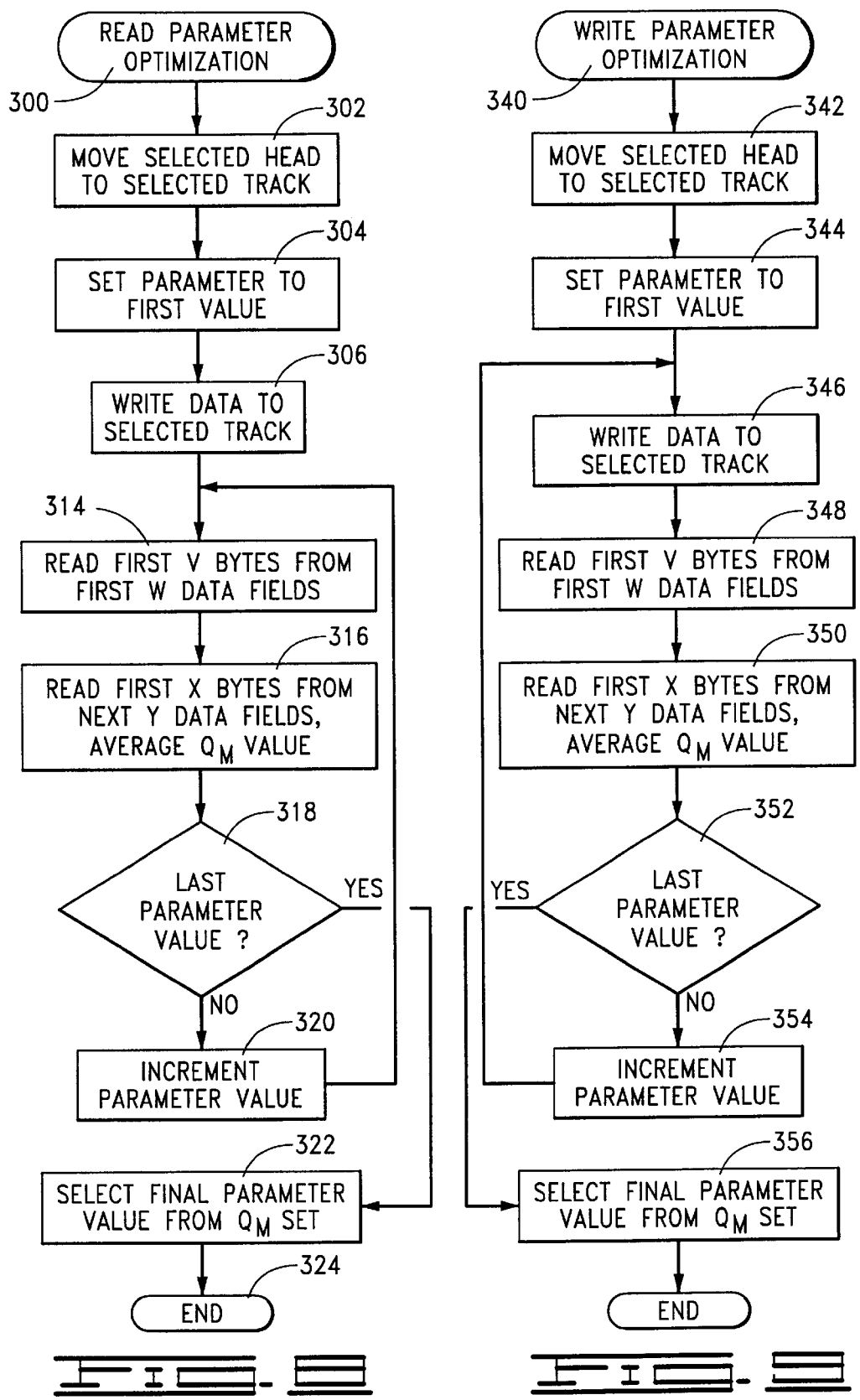

PARAMETRIC OPTIMIZATION USING DISC DRIVE READ CHANNEL QUALITY MEASUREMENTS

RELATED APPLICATIONS

This application claims the benefit of U.S. Provisional Application No. 60/062,505 entitled TECHNIQUE FOR IMPROVED CHANNEL OPTIMIZATION, filed Oct. 16, 1997.

FIELD OF THE INVENTION

The present invention relates generally to the field of disc drive devices and more particularly, but without limitation, to the efficient selection of appropriate data channel and servo circuit parameter values to optimize the operational performance of a disc drive.

BACKGROUND

Hard disc drives are used in modern computer systems and computer networks to enable users to store and retrieve vast amounts of data in a fast and efficient manner. A typical disc drive houses five to ten magnetic discs which are axially aligned for rotation by a spindle motor at a constant, high speed. An array of read/write heads are controllably positioned adjacent recording surfaces of the discs in order to store and retrieve data from tracks defined on the disc surfaces. The heads fly adjacent the recording surfaces on air bearings established by air currents set up by the rotation of the discs.

The heads are mounted to a rotary actuator assembly to which a coil of a voice coil motor (VCM) is attached. As is known in the art, a VCM includes a pair of magnetic flux paths between which the coil is disposed so that the passage of current through the coil causes magnetic interaction between the coil and the magnetic flux paths, resulting in the controlled rotation of the actuator assembly and the movement of the heads across the disc surfaces.

A closed loop, digital servo circuit is used to control the application of current to the coil, and hence the position of the heads with respect to the tracks. More particularly, the tracks are defined from servo information that is written to the discs during disc drive manufacturing and is stored as a plurality of radially extending wedges on each recording surface. Each servo wedge comprises a plurality of adjacently disposed servo fields, with each servo field defining a different track on the disc surface.

During operation, the servo fields are periodically sampled by a selected head to provide an indication to the servo circuit of the position of the head relative to the disc. When the disc drive is in a track following mode of operation, the servo circuit makes continuous adjustments to the amount of current passing through the coil in order to maintain the selected head over a corresponding track. During a seek operation wherein the selected head is moved from an initial track to a destination track, the servo circuit applies a succession of current values to the coil to first accelerate and then decelerate the head to the destination track in relation to the measured head velocity and a velocity trajectory profile.

A typical disc drive is further provided with data channel circuitry to facilitate the transfer of data between the discs and a host computer in which the disc drive is mounted. As known in the art, the data channel circuitry comprises a write channel which encodes and serializes the user data to be stored so as to generate a succession of write currents which are passed through the selected head to write the data to data fields formatted between adjacent servo fields on the disc. The data channel circuitry further includes a read channel which decodes readback signals generated by the head as the head passes over selected data fields to reconstruct the data and pass the same to the host computer. Error correction codes (ECC) are employed to detect and correct up to a selected number of errors in the recovered data.

Disc drive manufacturers typically produce a large number of nominally identical drives which are individually optimized during the manufacturing process through the setting of parameters that affect the operation of various disc drive circuits, such as the data channel and the servo circuit. Such parameters are well known and typically include write current, write precompensation, servo gain, data and servo level detection thresholds, transversal equalizer tap weights, adaptive filtering parameters and, in disc drives employing magneto-resistive (MR) heads, read bias current and reader offset. Such parameters are used to enable the disc drive to accommodate changes in data transfer rates that occur with respect to the radii on the discs at which the data are stored, noise levels, electrical and mechanical offsets and the like, all of which generally affect the operation of the drive.

Accordingly, the parameters are often set to an initial value during disc drive operation and then optimized against predefined acceptance criteria (for example, measured read error rate). Disc drives are often further provided with the capability of continually monitoring drive performance and adjusting certain parameters adaptively during operation to maintain optimum levels of performance.

The optimization of a selected parameter typically involves selecting a first value for the parameter, writing test data to one or more tracks, reading the data and calculating an error rate for the first value. The process is then repeated with the parameter being sequentially incremented so that a population of error rates is obtained for a range of parameter values. An optimum parameter value is then selected from the range of parameter values, the optimum parameter value providing optimum performance for the drive.

Read error rates in modern drives are relatively low; for example, a typical disc drive might detect one read error out of $10^9$ bits read (usually expressed in the form $1 \times 10^{-9}$ read errors/bit). Because read error rates are so low, a relatively large amount of data must usually be written and then read in order to facilitate differentiation between the effects of one parameter value to the next. Thus, parameter optimization takes a significant amount of time to complete, in that error rates are typically calculated for a number of different, incremented parameter values over a predetermined range of values. The parameters are further typically optimized on a per-head basis, and per-zone in disc drives employing zone based recording. Parameters are often also optimized for different ambient temperature conditions and for multiple parametric interdependencies (where the effect of one parameter is dependent in part upon the particular value of another parameter).

Because the trend in the industry is to provide ever increasing amounts of parametric adaptivity in successive generations of drives, in many cases there is simply not enough time in the manufacturing cycle to optimize every parameter that could be optimized in a drive. Hence, disc drive manufacturers typically attempt to optimize only those parameters that provide the greatest improvements in disc drive performance in the limited manufacturing cycle time available in which to test each drive. Remaining parameters are often simply set to predefined values which may or may not be later optimized during field operation.

Accordingly, there is a need in the art for an improved approach to selecting parameter values for a disc drive so as to reduce the amount of data that must be written and read in order to differentiate the effects of various parameter value combinations, so that greater levels of optimization can be achieved.

SUMMARY OF THE INVENTION

The present invention is directed to an apparatus and method for optimizing the operational performance of a disc drive.

In a preferred embodiment, the disc drive includes a head adjacent a rotatable disc, a servo circuit which controls the position of the head and a read channel which decodes read signals from the head to reconstruct data previously stored on the disc.

The read channel includes a channel quality monitor which generates a channel quality measurement indicative of read channel quality, the channel quality measurement determined from error values associated with the data reconstructed by the read channel from the read signal.

An optimum value for a selected parameter affecting disc drive performance is selected by determining an associated quality measurement value for each of a plurality of parameter values, and selecting the optimum value for the parameter in relation to the associated quality measurement values.

Preferably, each associated quality measurement value is determined in less than one revolution of the disc, thereby reducing by multiple orders of magnitude the number of revolutions required to optimize the parameter, as commonly performed in prior art parameter optimization methodologies.

These and various other features as well as advantages which characterize the present invention will be apparent from a reading of the following detailed description and a review of the associated drawings.

BRIEF DESCRIPTION OF THE DRAWINGS

FIG. 6 provides a graphical illustration of an error rate curve for a first parameter (Parameter 1), plotted against an x-axis indicative of different incremented values for the parameter and a y-axis indicative of detected read error rate, the error rate curve having "bucket" type characteristics.

FIG. 7 provides a graphical illustration of an error rate curve for a second parameter (Parameter 2), plotted against an x-axis indicative of different incremented values for the parameter and a y-axis indicative of detected read error rate, the error rate curve having "bi-modal" type characteristics.

FIG. 8 is a flow chart illustrating the general steps performed in accordance with a READ PARAMETER OPTIMIZATION routine, for which associated programming is stored in the flash memory device of FIG. 2 and utilized by the control processor of FIG. 2 in accordance with a preferred embodiment of the present invention.

FIG. 9 is a flow chart illustrating the general steps performed in accordance with a WRITE PARAMETER OPTIMIZATION routine, for which associated programming is stored in the flash memory device of FIG. 2 and utilized by the control processor of FIG. 2 in accordance with a preferred embodiment of the present invention.

FIG. 10 provides a representation of a portion of a track of one of the discs of the disc drive of FIG. 1, illustrating the relative placement of servo and user data fields on the track.

FIG. 11 is a graphical representation of a quality measurement curve obtained for a selected parameter (Parameter 3) in accordance with the practice of a preferred embodiment of the present invention, plotted against an x-axis indicative of a number of different, incremented parameter values and a y-axis indicative of quality measurement values.

DETAILED DESCRIPTION

Figure 1:
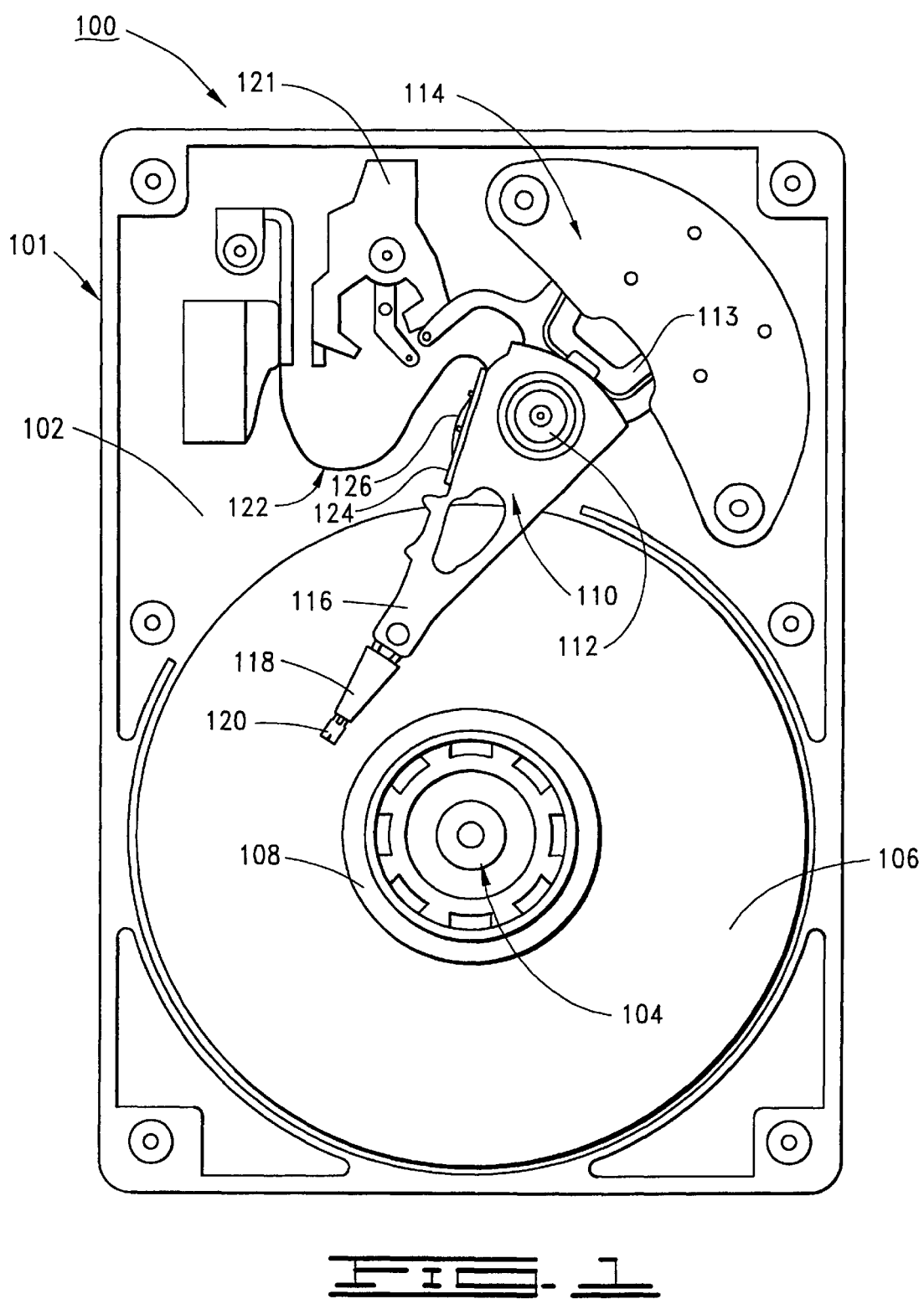
FIG. 1 provides a top plan view of a disc drive constructed in accordance with a preferred embodiment of the present invention.

Referring now to FIG. 1, shown therein is a top plan view of a disc drive 100 constructed in accordance with a preferred embodiment of the present invention.

The disc drive 100 includes a head-disc assembly (HDA) 101 and a disc drive printed wiring assembly (PWA) which is mounted to the underside of the HDA 101 to complete the disc drive 100. Although not shown in FIG. 1, the PWA provides circuitry necessary to control the operation of the HDA 101 and to transfer data between the HDA 101 and a host computer in which the disc drive 100 can be mounted in a user environment.

As shown in FIG. 1, the HDA 101 includes a base deck 102 to which various disc drive components are mounted. A top cover, which has been omitted from FIG. 1 to facilitate the present discussion, cooperates with the base deck 102 to form an internal, sealed environment for the disc drive 100. A spindle motor 104 is provided to rotate a stack of discs 106 at a constant high speed, with a disc clamp 108 securing the discs 106 to the spindle motor 104.

To access the discs 106, a controllably positionable actuator assembly 110 is provided which rotates about a cartridge bearing assembly 112 in response to currents applied to a coil (a portion of which is shown at 113) of a voice coil motor (VCM) 114. The actuator assembly 110 includes a plurality of arms 116 from which corresponding flexure assemblies 118 extend. Heads 120 are provided at distal ends of the flexure assemblies 118 and are supported over the discs 106 by air bearings established by air currents set up by the rotation of the discs 106.

A latch assembly 121 is provided to secure the heads over landing zones (not designated) at the innermost diameters of the discs 106 when the disc drive 100 is deactivated. A flex circuit assembly 122 provides electrical communication paths between the actuator assembly 110 and the disc drive PWA (mounted to the underside of the disc drive 100 as mentioned above). The flex circuit assembly 122 includes a flex circuit board 124 attached to the side of the actuator assembly 110, the flex circuit board 124 including a preamp driver and threshold circuit 126 (hereinafter also referred to as the "preamp") which is electrically coupled to the heads 120 and operates as discussed below.

Figure 2:
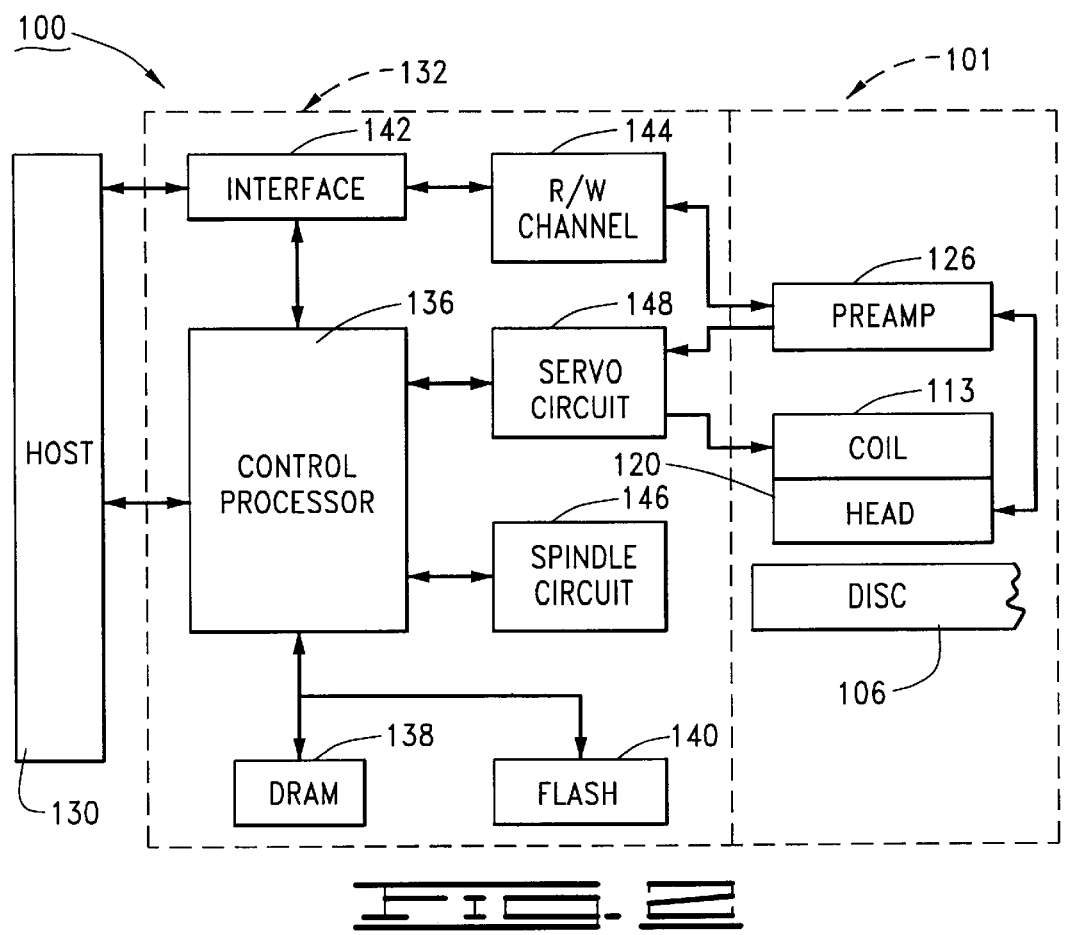
FIG. 2 is a functional block diagram of the disc drive of FIG. 1.

Referring now to FIG. 2, shown therein is a functional block diagram of the disc drive 100 of FIG. 1, which is contemplated as being mounted in a host computer 130. More particularly, FIG. 2 illustrates relevant portions of the HDA 101 of FIG. 1 and the disc drive PWA (indicated at 132).

The host computer 130 provides top level control of a disc drive control processor 136, which in turn controls the operation of the disc drive 100 in accordance with programming and parameter values stored in dynamic random access memory (DRAM) 138 and non-volatile flash memory 140.

Data to be stored by the disc drive 100 are transferred from the host computer 130 to an interface circuit 142, which includes a data buffer for temporarily buffering the data and a sequencer for directing the operation of a read/write channel 144 and the preamp 126 during data transfer operations. A spindle circuit 146 is provided to control the rotation of the discs 106 through back electromotive force (bemf) commutation of the spindle motor 104 (FIG. 1). A servo circuit 148 is provided to control the position of the head 120 relative to the disc 106 as part of a servo loop established by the head 120, the preamp 126, the servo circuit 148 and the coil 113.

Figure 3:
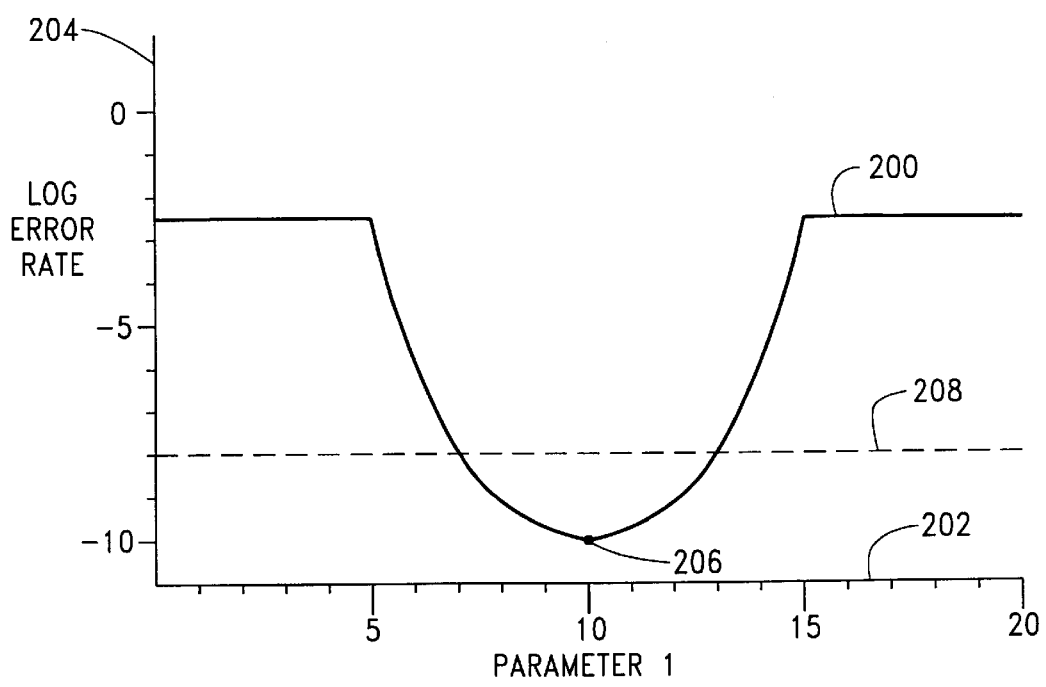
FIG. 3 is a functional block diagram of a read channel of the disc drive of FIG. 1, including a channel quality monitor constructed in accordance with a preferred embodiment of the present invention.

FIG. 3 provides a functional block diagram of a read channel portion 150 of the read/write channel 144 of FIG. 2, in conjunction with a selected one of the heads 120 and the preamp 126. As will be recognized, the read channel 150 is used to recover data previously stored to the discs 106. Of particular interest is a channel quality monitor 152, which as will be explained in greater detail below provides a quality measurement value indicative of the relative read performance of the read channel 150. Such circuits are well known and are commonly incorporated into commercially available data channels such as an MS151 KingCobra EPR4 PRML Read Channel Device, manufactured by Lucent Technologies, Inc. of Allentown, Pa., USA.

To provide an overview of the general operation of the read channel 150 of FIG. 3, readback signals are first generated by the head 120 as the head passes over selected portions of a track on the associated disc (not shown). The readback signals are detected and amplified by the preamp 126, after which a variable gain amplifier 154 sets the gain of the signal to a level suitable for use by remaining portions of the read channel 150.

An adaptive prefilter 156 applies low pass filtering to remove higher frequency noise components from the signal and a transversal equalizer 158 performs time-domain equalization to filter the readback signal to a preselected partial response, maximum likelihood detection (PRML) target waveform, depending upon the selected class of PRML signal processing employed (in this case EPR-4). The output of the transversal equalizer 158 is sampled (digitized) by an analog to digital (A/D) converter 160.

The samples are used by a timing and gain control circuit 162 to adjust the gain of the VGA 154, as well as to adjust the frequency of a phase locked loop (not separately shown) used by a Viterbi decoder 164 to decode read data from the samples obtained from the transversal equalizer 158. The recovered data sequence from the Viterbi decoder 164 is provided to a 16/17 decoder 166, which converts each set of 17 bits stored to the disc 106 back to the original 16 bits of user data to remove the RLL encoding used to ensure reliable timing during the read recovery process. Although 16/17 encoding has been disclosed, it will be understood that other encoding rates can readily be utilized. The output from the 16/17 decoder 166 is provided to an error correction code (ECC) circuit 168, which performs error detection and correction upon the received sequence (using, for example Reed-Solomon codes) and, if no uncorrectable errors are present, outputs the data to the interface circuit 142 (FIG. 2) for subsequent transfer to the host computer 130. For reference, erasure pointers indicative of selected bytes that may include erroneous data are provided to the ECC circuit 168 by the preamp 126 and the 16/17 decoder 166 in a manner known in the art, to improve the detection and correction capabilities of the ECC circuit 168.

As will be recognized, the output from the Viterbi decoder 164 will optimally comprise a data sequence corresponding to the encoded data originally written to the selected track. This sequence is provided to the channel quality monitor 152 which performs a running assessment of the channel quality using error values provided by the Viterbi decoder 164. The channel quality monitor 152 generates a status byte which represents the integral, or sum, of the square of the sampled data bit error values recovered during the read operation. The magnitude of this status byte ("channel quality measurement") is representative of the overall quality of the data signal during the read event; the lower the magnitude, the higher the quality of the signal. Because the individual sample errors are squared, larger errors generally carry much more significance than smaller errors in the overall count.

In a preferred embodiment, the A/D converter 160 produces sample values over a symmetrical integer range (−18 to +18), and each sample received by the Viterbi decoder 164 will have one of three values corresponding to symbol values of −1, 0 and +1 (−14, 0, or +14). Thus, samples other than these will have non-zero error values. Accordingly, the Viterbi decoder 164 provides these error values to the channel quality monitor 152, which accumulates the same in a summing register (identified at $Q_m$ in FIG. 3) to generate the channel quality measurements. The summing register $Q_m$ can thereafter be periodically polled by the control processor 136.

It is advantageous to linearly scale the squared error values before being summed and then to linearly scale the resulting sum, so that the measurement fits in a single-byte register. When a new sector of data is read, the channel quality monitor 152 typically clears the summing register during receipt of the associated phase-locked loop (PLL) recovery field and then begins adding the calculated squares of the error values when data recovery begins. As desired, a root mean squared (RMS) integral of error can readily be determined for the quality measurement by further dividing the sum by the total number of bits received and then taking the square root of this value. It will be recognized that various methodologies for calculating channel quality measurements are well known in the art.

Figure 4:
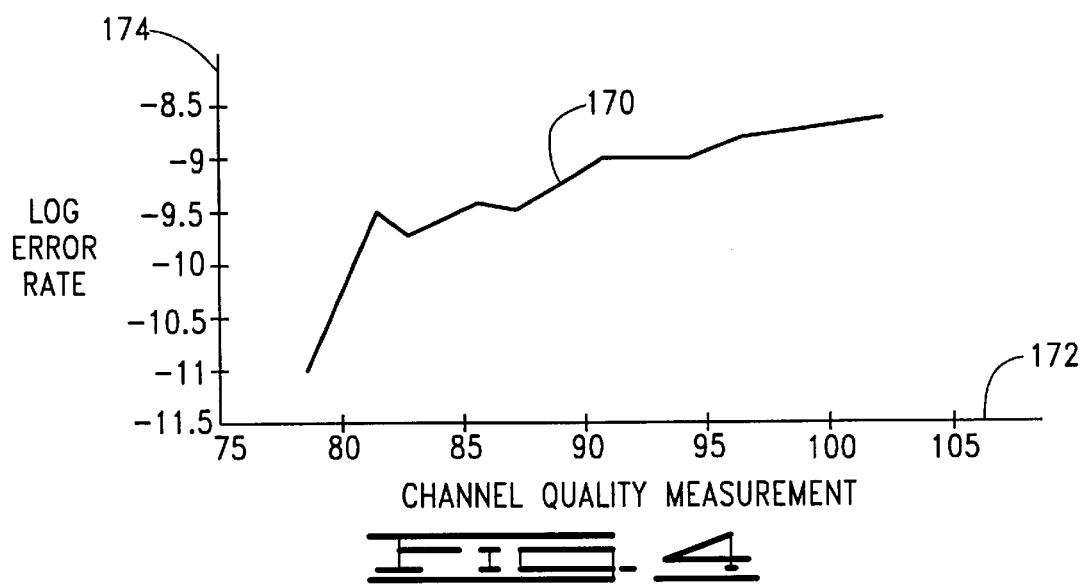
FIG. 4 is a graphical representation of the relationship between channel quality measurements provided by the channel quality monitor of FIG. 4 and detected read error rate achieved by the read channel of FIG. 4.

Through experimentation, the relationship between the channel quality measurement and the overall channel read error rate can be readily identified. For purposes of illustration, FIG. 4 provides a graphical representation of a channel quality measurement curve 170 plotted against an x-axis 172 indicative of channel quality measurement (output by the channel quality monitor 152) and a y-axis 174 indicative of error rate (log). As shown in FIG. 4, a channel quality measurement of about 78 on the curve 170 corresponds to a read error rate of about $1 \times 10^{-11}$ read errors/bit retrieved from the read channel 150, whereas a channel quality measurement of about 90 corresponds to a read error rate of about $1 \times 10^{-9}$ read errors/bit.

Further, the relationship between channel read error rate and the probability of passing undetected, erroneous data ("$P_{ued}$") can also be determined for a given population of drives. $P_{ued}$ generally comprises the rate at which erroneous data will be unknowingly passed from the disc drive 100 to the host computer 130. Because such an event is particularly undesirable, the $P_{ued}$ is usually specified at an extremely low value.

Figure 5:
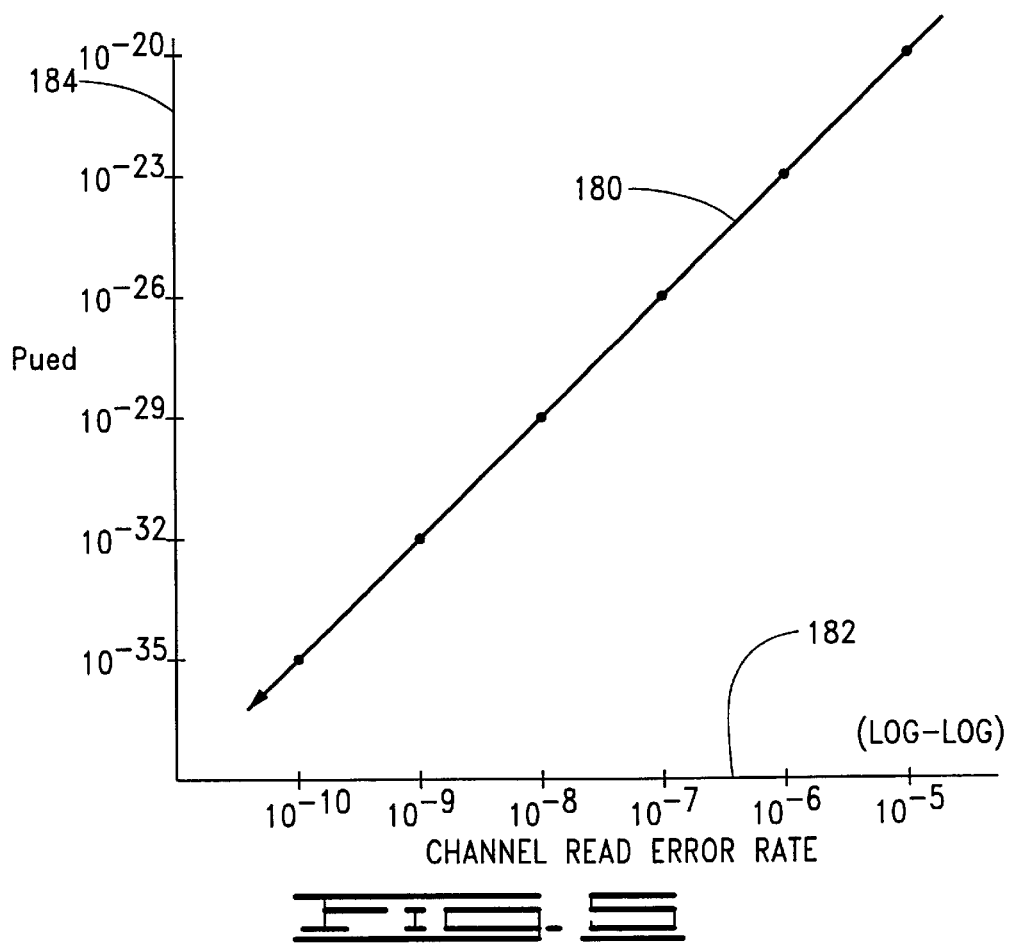
FIG. 5 is a graphical representation of the relationship between detected read error rate and the probability of passing undetected, erroneous data to the host computer shown in FIG. 2.

FIG. 5 shows the general relationship between channel read error rate and $P_{ued}$. More particularly, FIG. 5 includes a correlation curve 180 plotted against channel read error rate (log) on an x-axis 182 and $P_{ued}$ (log) on y-axis 184. Hence, a $P_{ued}$ of $1\times10^{-32}$ undetected read errors/bit corresponds to a channel read error rate of about $1\times10^{-9}$ detected read errors/bit. In practice, disc drive manufacturers typically determine a minimum acceptable $P_{ued}$, determine the corresponding detected read error rate, and then use the detected read error rate as acceptance criteria during product testing to ensure adequate $P_{ued}$ levels are attained.

As discussed above, the disc drive 100 is provided with a variety of selectively variable parameters which, to a greater or lesser extent, control the operation (including error rate performance) of the disc drive 100. Such parameters can include write current values, read bias current values, tap weights for the transversal equalizer 158 (FIG. 3), adaptive parameters used by the adaptive prefilter 156 (FIG. 3), threshold values used by the preamp 126 (FIGS. 2 and 3), gain values used by the servo circuit 148 (FIG. 2) and the like, all of which are well known to those skilled in the art. Accordingly, prior art approaches for selecting optimum values for a given parameter have generally involved setting this parameter to a plurality of values over a predetermined range and calculating a detected channel read error rate for each value. The results of such an operation are shown in FIG. 6, which provides a read error rate curve 200 plotted against an x-axis 202 indicative of 20 different, incremental values for a selected parameter (referred to as "Parameter 1") and a y-axis 204 indicative of the resulting measured read error rate (log).

As shown in FIG. 6, a well-defined "bucket" is formed from the read error rate curve 200, with an optimal operational point denoted at 206 which provides optimal read error rate performance for the disc drive 100. Accordingly, during such testing the 20 different values for Parameter 1 are evaluated and the value providing the best read error rate would be stored and thereafter used for the Parameter 1. The read error rate curve 200 can further be compared to a threshold 208 corresponding to a selected channel read error rate (such as discussed above in FIGS. 4 and 5) to ensure the selected value for the Parameter 1 provides read channel performance that meets this specified criteria. The threshold 208 can also be used in the selection of the final parameter value, such as by selecting the first parameter value that provides an error rate within the threshold.

However, shortcomings exist with such prior art parameter optimization methodologies. For example, all read error rate curves are not so well behaved as the bucket-shape illustrated in FIG. 6. Rather, read error rate curves such as 210 in FIG. 7 can often be obtained, due to the various effects that a given parameter can have upon the read error rate. The read error rate curve 210 is plotted against an x-axis 212 indicative of 20 incremental values for a selected parameter (generally identified as "Parameter 2") and a y-axis 214 indicative of read error rate (a read error rate threshold is shown at 216).

From FIG. 7, it will be recognized that the curve 210 has a bi-modal response. An operational point at 218 provides minimum error rate and hence the best read channel performance, but small changes in environmental or operational conditions could cause the performance to "shift" (i.e., move either to the left or the right of the point 218 along the curve 210), which would have a significant effect upon the read performance of the channel. Thus, a better selection for the value of Parameter 2 might be at point 220, which provides a higher, albeit more stable, read error rate for the read channel 150. Accordingly, one problem encountered in prior art parameter optimization techniques is the fact that parameter read error rate curves can have multi-mode characteristics, requiring evaluation and decision making points to determine an optimum value from the data.

However, an even greater limitation associated with prior art parameter optimization techniques is the sheer amount of data that must be written and read in order to obtain sufficient data to plot each read error rate curve (such as 200, 210 in FIGS. 6 and 7). That is, the statistical evaluation of a read error rate in the range of $1\times10^{-9}$ detected read errors/bit requires the reading of many more than $10^9$ bits; in practice, the generation of curves such as 200, 210 requires the writing and reading of data over thousands of disc revolutions to obtain sufficient data to optimize each parameter for each head-disc combination (and further for different track-zones on each disc 106, as is common practice). There is therefore a limit to the amount of optimization that can be performed in a given disc drive for a given amount of test time, leaving designers little choice but to optimize only those parameters which provide the greatest benefit, as the extension of the manufacturing cycle to allow full optimization is not economically feasible.

Accordingly, the present invention overcomes these and other limitations of the prior art by enabling disc drive designers to more fully optimize disc drive parameters through the use of channel quality measurements. In accordance with a preferred embodiment, the disc drive 100 is provided with programming that evaluates each parameter value on the basis of the resulting channel quality measurement from the channel quality monitor 152 (FIG. 3) over a single revolution of the discs 106.

With reference to FIGS. 8 and 9, shown therein are generalized flow charts for a READ PARAMETER OPTIMIZATION routine and a WRITE PARAMETER OPTIMIZATION routine, respectively, representative of programming stored in flash memory 140 (FIG. 2) and utilized by the control processor 136 (FIG. 2). As explained below, the routine of FIG. 8 is generally utilized to optimize each parameter that affects the reading of data from the discs 106 (such as read channel parameters), whereas the routine of FIG. 9 is generally utilized to optimize each parameter that affects the writing of data to the discs 106 (such as write current levels). Moreover, the routines of FIGS. 8 and 9 are preferably performed for each parameter for each zone of tracks on each disc surface. For reference, zone based recording techniques are discussed in U.S. Pat. No. 4,799,112 issued Jan. 17, 1989 to Bremmer et al.

Beginning with a discussion of the READ PARAMETER OPTIMIZATION routine of FIG. 8 (which has been generally denoted therein at 300), a selected head 120 is moved to a selected track on the associated disc 106 at block 302, the selected track residing in the associated zone for which the selected read parameter is to be optimized. The parameter is next set to a first value out of a predetermined range of values (such as the 20 parameter values discussed above and shown on the x-axes 202, 212 of FIGS. 6 and 7) by the operation of block 304.

Once the head 120 has been properly located over the selected track and the parameter being evaluated has been set to its initial value, the disc drive proceeds to write test data to the track, as indicated by block 306. Preferably, the disc drive 100 employs an embedded servo scheme so that each track includes both servo fields which provide the necessary information to the servo circuit 148 to control the position of the head 120, as well as user data portions between each pair of adjacent servo fields to which the user data are stored. FIG. 10 illustrates a portion of a selected track 308 formatted in accordance with this scheme, so that servo fields 310 are interspersed with user data portions 312 as shown. The servo fields 310 are written during disc drive manufacturing and the user data portions are formatted into one or more user data fields (not separately shown in FIG. 10), as desired. Preferably, there are a total of 78 servo fields 310, and 78 corresponding user data portions 312, on each track 308 on the discs 106.

The operation of block 306 of FIG. 8 writes test data in the form of one large data field to each user data portion 312 on the selected track 308. It will be understood that in addition to the test data, the disc drive 100 further writes the requisite leading control information, such as synchronization and automatic gain control fields, to ensure proper operation of the read channel 150. Such writing is performed in a manner generally similar to that used in prior art parameter optimization methodologies, except that the writing of multiple tracks of data is unnecessary.

Continuing with FIG. 8, the flow passes from block 306 to block 314 wherein the disc drive 100 operates to initially optimize the self-adaptive characteristics of the read channel 150. This is accomplished by reading the first V bytes from the first W data fields on the track 308 and allowing elements within the read channel 150, such as the variable gain amplifier 154 and the transversal equalizer 158, to adapt in response to this data. Although the requirements for such a step depend upon the application, in a preferred embodiment V is set equal to 1024 and W is set equal to 35, so that the first 1024 bytes from the first 35 data fields (user data portions 312, FIG. 10) are read during the operation of block 314. As there are preferably 78 data fields, the operation of block 314 consumes a little less than half a revolution of the disc 106.

The flow of FIG. 8 next passes to block 316 wherein the next X bytes from the next Y data fields are read. Preferably, X is set to 512 and Y is set to 35. It follows that the operation of block 316 consumes a little less than the remaining portion of the revolution of the disc 106 so that both blocks 314 and 316 can be readily executed during the same revolution of the disc 106.

Preferably, the $Q_m$ register of the channel quality monitor 152 is reset for each data field (after the contents are retrieved and stored by the control processor 136) so that a total of 35 channel quality measurements are obtained, after which these measurements are averaged to obtain an average quality measurement value. Whereas in the present discussion X has been set equal to 512 bytes, other values for X can be selected as desired, so long as the value is sufficiently high to generate a valid channel quality measurement for each of the 35 data fields that are read. This will depend in part upon the characteristics of the particular channel quality monitor employed.

Once the average quality measurement value has been obtained, the flow continues to decision block 318, which determines whether the last parameter value has been evaluated; if not, the flow passes to block 320 where the parameter value is incremented and the flow then returns back to block 314. The flow of FIG. 8 will thus continue until an average quality measurement value is determined for each corresponding parameter value, after which the flow will pass from decision block 318 to block 322 wherein the final parameter value is determined therefrom and the routine ends at 324. To more fully illustrate the operation of block 322, FIG. 11 has been provided which shows a graphical representation of a set of average quality measurement values obtained as a result of the operation of the routine of FIG. 8 for a selected parameter identified as "Parameter 3".

As shown in FIG. 11, a quality measurement curve 330 is plotted against an x-axis 332 indicative of 20 different incremented values for Parameter 3 and a y-axis 334 indicative of the resulting average quality measurement value obtained by the operation of block 316 (FIG. 8). A minimum average quality measurement value is identified in FIG. 11 at point 336, indicating that the best read channel performance is obtained with the parameter set to the corresponding value for this point. Thus, the operation of block 322 in FIG. 8 includes an evaluation of the resulting set of average quality measurement values and the selection of the optimal parameter value in relation to the parameter value providing the minimum average quality measurement value. For the example of FIG. 11, the eighth parameter value, which corresponds to point 336 on the curve 330, would be selected as the optimum parameter value.

Having concluded the discussion of the READ PARAMETER OPTIMIZATION routine of FIG. 8, reference is now made to FIG. 9 for a brief discussion of the WRITE PARAMETER OPTIMIZATION routine, generally denoted therein at 340.

A review of FIG. 9 shows that this routine is quite similar to the routine of FIG. 8, except that the test data is rewritten for each incremented parameter value in order to assess the effects of the parameter values upon the writing characteristics of the disc drive 100. Accordingly, as with the routine of FIG. 8, the routine of FIG. 9 moves the selected head 120 to the selected track (such as 308, FIG. 10) on the corresponding disc surface at block 342. Once the selected write parameter is set to its initial value, block 344, the test data is written to the track 308 by block 346, with one data field per user data portion 312 (FIG. 10).

The read channel 150 is initialized by reading the first V bytes from the first W data fields on the track 308 (block 348) and as before, the values of V and W are preferably set to 1024 bytes and 35 data fields, respectively. Thereafter, at block 350 the first X bytes from the next Y data fields are read, with quality measurement values being obtained for each of the Y data fields and these quality measurement values being averaged. Preferably, X is set to 512 bytes and Y is set to 35 data fields.

The routine continues at decision block 352, where a determination is made whether the last parameter value for the selected parameter has been evaluated; if not, the routine passes to block 354 where the parameter value is incremented to the next value and the routine returns to block 346, where a new set of test data is written to the track 308. Accordingly, the flow of FIG. 9 continues until average quality measurement values have been determined for each of the parameter values for the selected parameter, after which the parameter is optimized by block 356 and the routine ends at 358. As before, the selected parameter is optimized in relation to the minimum average quality measurement value, as discussed above with reference to FIG. 11.

It will now be clear that the present invention provides several important advantages over the prior art. Both the READ PARAMETER OPTIMIZATION routine of FIG. 8 and the WRITE PARAMETER OPTIMIZATION routine of FIG. 9 allow a substantial reduction in the amount of data that must be written and read to evaluate each parameter value. A significant amount of time can be gained due to the fact that only one track of data needs be written at each head-track combination, and read back only once for each parameter value, to optimize all of the read channel parameters in the disc drive 100. Similarly, only one track of data need be written for each unique write parameter value. Such operation results in a reduction in the number of requisite disc revolutions by multiple orders of magnitude.

Accordingly, it is contemplated that the present invention will enable disc drive designers to take advantage of ever increasing levels of adaptivity to achieve better drive performance through fully optimizing a wider range of parameters. Moreover, because the routines of FIGS. 8 and 9 can be performed in a minimal amount of time, the routines can be performed at other times besides manufacturing, such as idle periods of time when the disc drive 100 is not required to service commands from the host computer 130.

Accordingly, it will be recognized from the foregoing discussion that the present invention is generally directed to an apparatus and method for optimizing the operational performance of a disc drive (such as 100) having a head (such as 120) adjacent a rotatable disc (such as 106), a servo circuit (such as 148) which controls the position of the head and a read channel (such as 150) which decodes read signals from the head to reconstruct data previously stored on the disc.

The read channel includes a channel quality monitor (such as 152) which generates a channel quality measurement indicative of read channel quality, the channel quality measurement determined from error values associated with the data reconstructed by the read channel from the read signal.

An optimum value for a selected parameter affecting disc drive performance is selected by determining an associated quality measurement value for each of a plurality of parameter values (such as by 316, 350), and selecting the optimum value for the parameter in relation to the associated quality measurement values (such as by 322, 356). Preferably, each associated quality measurement value is determined in less than one revolution of the disc.

For purposes of the appended claims, it will be clearly understood in accordance with the foregoing discussion that the term "parameter" will be broadly understood to cover any number of types of inputs which affect the operational performance of the disc drive and can be controllably varied by the disc drive, such as the examples set forth hereinabove. Moreover, the appended claims include a number of steps which are set forth in a particular order, but it will be readily understood that the scope of the claims is not necessarily limited to the order of the steps presented.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type having a rotatable disc, a head controllably positionable adjacent tracks on the disc and a read channel for decoding a read signal from the head to reconstruct data previously stored in data fields of the tracks, the read channel including a channel quality monitor which generates a channel quality measurement indicative of read channel quality, the channel quality measurement determined from error values associated with the data reconstructed by the read channel from the read signal, wherein each quality measurement value is distinct from and correlatable to a bit error rate defined as a ratio of total bits of reconstructed data and a number of erroneous bits of reconstructed data, and wherein the disc drive has at least one variable parameter affecting operational performance of the disc drive, a method for selecting an optimum value for the parameter, comprising steps of:

(a) for each of a plurality of different values for the parameter, using the channel quality monitor to determine a corresponding quality measurement value for data from at least one selected track; and (b) selecting the optimum value for the parameter in relation to the quality measurement values obtained for each of the plurality of different values for the parameter.

2. The method of claim 1, wherein the parameter affects the operation of the read channel of the disc drive, and wherein data is initially written to a plurality of data fields of the selected track.

3. The method of claim 1, wherein the parameter affects data write performance of the disc drive, and wherein data is sequentially written to the selected track using each of the plurality of different values for the parameter so that the quality measurement values obtained by the channel quality monitor reflect the affect by each of the plurality of different values for the parameter upon the data write performance of the disc drive.

4. The method of claim 1, wherein data are stored in a plurality of user data fields on the selected track, and wherein step (a) further comprises steps of:

(ai) reading a first X bytes from each of a number Y of the user data fields from the selected track;

(aii) determining a per-user data field quality measurement value for each of the Y user data fields; and (aiii) averaging the per-user data field quality measurement values to obtain an average quality measurement value.

5. The method of claim 4, wherein step (a) further comprises steps of:

(aiv) reading a first V bytes from each of a number W of the user data fields from the selected track to enable the read channel to self adapt.

6. The method of claim 5, wherein a sum Z=W+Y of the number of user data fields is less than or equal to the plurality of user data fields of the selected track so that step (a) is performed over a single revolution of the disc for each of the plurality of different values for the parameter.

7. A method for optimizing operational performance of a disc drive of the type having a rotatable disc, a head controllably positionable adjacent tracks on the disc and a read channel for decoding a read signal from the head to reconstruct data previously stored in data fields of the tracks, the read channel including a channel quality monitor which generates a channel quality measurement indicative of read channel quality, the channel quality measurement determined from error values associated with the data reconstructed by the read channel from the read signal, the method comprising steps of:

(a) identifying a parameter which affects the operational performance of the disc drive;

(b) setting the parameter to a first value;

(c) writing test data to selected data fields of a selected track;

(d) reading at least a portion of the test data from each of at least a portion of the selected data fields of the selected track and generating a channel quality measurement for each portion of the test data;

(e) averaging the channel quality measurements to generate an average channel quality measurement;

(f) temporarily storing the average channel quality measurement as a first measurement;

(g) setting the parameter to a second value different from the first value and repeating at least steps (d) and (e);

(h) temporarily storing the average channel quality measurement as a second measurement; and (i) setting the parameter to a final value in relation to the first and second measurements.

8. The method of claim 7, wherein step (g) further comprises repeating at least step (c).

9. A disc drive, comprising:

a head adjacent a rotatable disc;

a servo circuit, operably coupled to the head, for controlling the position of the head relative to tracks defined on a surface of the disc;

a read channel, operably coupled to the head, which decodes read signals generated by the head to reconstruct data previously stored to the tracks of the disc, the read channel comprising a channel quality monitor which generates a channel quality measurement indicative of read channel quality, the channel quality measurement determined from error values associated with the data reconstructed by the read channel from the read signals; and a control processor, operably coupled to the servo circuit and the read channel, having associated programming to:

move the head to a position adjacent a selected track;

set a selected parameter affecting operational performance of the disc drive to a first value;

obtain an average quality measurement for the first value by averaging quality measurements obtained as the head reads a series of portions of data from the selected track;

set the selected parameter to a second value and obtain an average quality measurement for the second value by averaging quality measurements obtained as the head reads a series of portions of data from the selected track; and select a final value for the parameter in relation to the average quality measurements obtained for the first and second values.

10. The disc drive of claim 9, wherein a new set of data are written to the selected track after the selected parameter is set to the second value and before the head reads the portions of data from the selected track.

* * * * *